Figure 1:
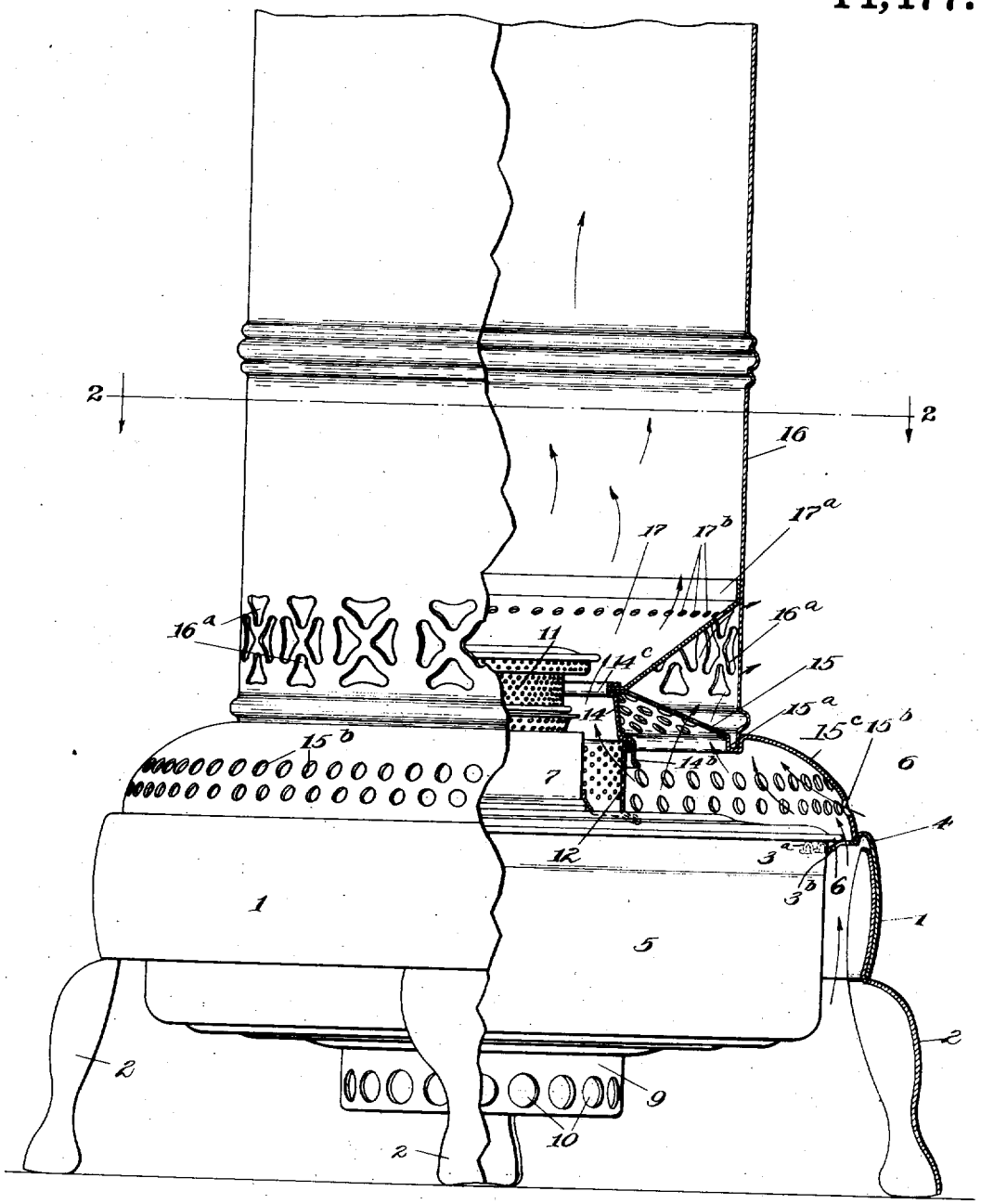

W. R. JEAVONS & A. R. WHITTAKER.

OIL STOVE.

APPLICATION FILED APR. 24, 1918.

Reissued May 28, 1918.

2 SHEETS—SHEET 1.

14,477.

WITNESSES:

R. L. Bruck.

H. B. McGill.

INVENTORS,

William R. Jeavons and R. Whittaker,

By Hull & Smith,

ATT'YS.

W. R. JEAVONS & A. R. WHITTAKER.

OIL STOVE.

APPLICATION FILED APR. 24, 1918.

Reissued May 28, 1918.

2 SHEETS—SHEET 2.

14,477.

WITNESSES:

R. L. Buck.

H. B. McGill.

INVENTORS,

William R. Jeavons,

Amos R. Whittaker,

By Hull & Smith

ATT'YS.

UNITED STATES PATENT OFFICE.

WILLIAM R. JEAVONS AND ARNOLD R. WHITTAKER, OF CLEVELAND, OHIO.

OIL-STOVE.

14,477. Specification of Reissued Letters Patent. Reissued May 28, 1918.

Original No. 1,258,416, dated March 5, 1918, Serial No. 855,044, filed August 4, 1914. Application for reissue filed April 24, 1918. Serial No. 230,614.

*To all whom it may concern:*

Be it known that we, (1) WILLIAM R. JEAVONS, (2) ARNOLD R. WHITTAKER, citizens of the United States, residing at Cleveland, in the county of Cuyahoga and State of Ohio, have invented a certain new and useful Improvement in Oil-Stoves, of which the following is a full, clear, and exact description, reference being had to the accompanying drawings.

This invention relates to oil stoves, and more especially to stoves of the type known to the trade as "heaters" or "lamp stoves". It is the object of the invention to provide a coöperating construction of parts whereby an odorless flame may be produced and maintained at a height of maximum efficiency during the entire period of operation of the stove, notwithstanding the variations which will exist in the level of the oil in the font necessarily incidental to such operation. This object is secured in connection with a construction and arrangement of parts wherein the oil level will be positively maintained between two points (below the point of seepage and above the point where the wick will fail to feed sufficiently); this, together with the proper positioning and arrangement of the parts referred to hereinafter, will produce a heater free from the odors due to an excessive, as well as insufficient, oil supply to the burner and will at the same time prevent the charring of the wick, with the consequent increase in the life of the latter. One of the more limited objects of our invention (but one whereby a flame of maximum efficiency may be maintained) is to provide a construction whereby the temperature of the oil in the top of the font shall be maintained at approximately 115° F.; a temperature which reduces the viscosity of the oil to an extent that will insure a uniformly ample capillary feed to the exposed surface of the wick, notwithstanding the lowering of the oil level in the font during said continued operation and, on the other hand, will not unduly reduce such viscosity and produce undue vaporization of the oil within the top of the font. The invention disclosed herein is designed with reference to the construction shown in the patent to Wm. R. Jeavons No. 1,089,841, issued March 10, 1914.

Figure 2:
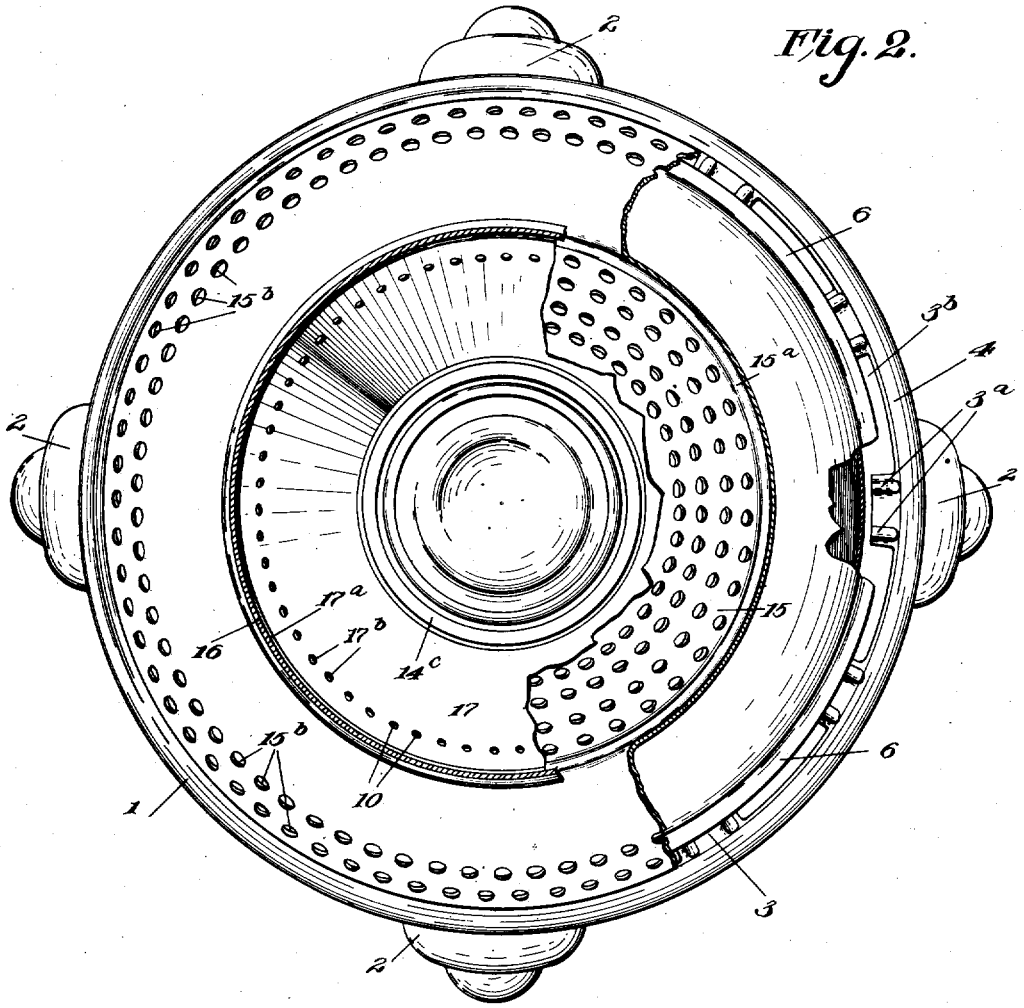
Figure 3:
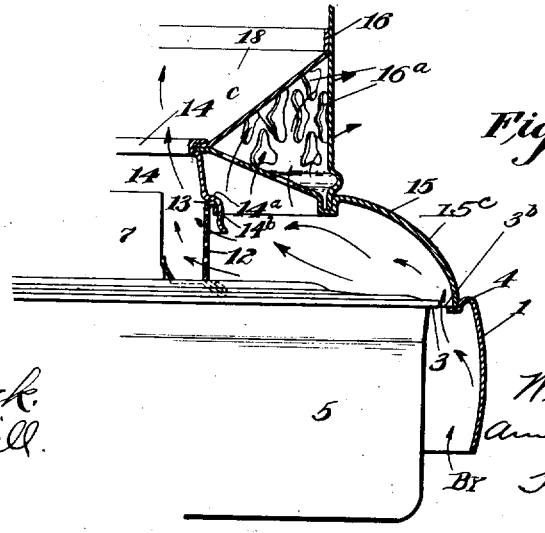

Further and more limited objects of the invention will appear hereinafter, the complete invention being disclosed in the drawings forming part hereof, wherein Figure 1 represents a view, partly in section and partly in elevation, of a stove constructed in accordance with our invention; Fig. 2 is a transverse sectional view corresponding to the line 2—2 of Fig. 1, certain of the parts being broken away; and Fig. 3 is a sectional detail of the lower portion of the drum and of the adjacent portions of the font, gallery, and stove base, said figure being a modification of the construction illustrated in the preceding views.

Describing by reference characters the various parts illustrated herein, 1 denotes a stove base having the legs 2. At its upper end, the base is provided with a plurality of inwardly projecting segmental flanges 3 each having bosses $3^a$ pressed upwardly therefrom. 5 denotes the font, which is mounted within the base and is supported on the upwardly projecting bosses $3^a$ by means of the substantially horizontal flange 6 at the top of the body of the font. It will be observed that slots $3^b$ are provided between the segmental flanges and between the flange 6 and the body 4. This font is a shallow metal reservoir having central vertically alined openings through which extends the outer wick tube 7. The top and the bottom of the font are substantially horizontal and are preferably provided with shallow annular ribs or corrugations between the peripheral and central portions thereof. Projecting downwardly from the bottom and extending around the bottoms of the wick tubes 7 and 8 is a wind shield 9 having perforations 10 in the outer wall thereof, the wind shield being of the type described and claimed in the application of Wm. R. Jeavons No. 782,005, filed July 30, 1913.

Projecting upwardly from the upper end of the inner wick tube is the air distributer, indicated generally at 11. This distributer may be of any approved type, such as shown in the patent to Jeavons No. 906,887, issued December 15, 1908. Projecting upwardly from the top of the font, and surrounding the upper end of the outer wick tube 7, is a perforated collar or gallery 12, which preferably extends upwardly about as high as the outer wick tube and is there bent outwardly in an inverted U-shape, as shown at 13, forming a seat for a collar 14 projecting downwardly from a central opening within the perforated bottom 15 of the stove drum 16. The collar is projected outwardly, as shown at $14^a$, to provide a seating portion cooperating with the top of the gallery 12, the lower end of the collar projecting downwardly below the top of the gallery and being flared outwardly, as shown at $14^b$. The particular construction of the gallery forms the subject matter of our copending application No. 855,045 filed August 4, 1914.

The bottom 15 of the drum is preferably formed by an inwardly projecting portion of the drum base (known to the trade as the "cone" plate) which is provided with an annular seat $15^a$ for the lower end of the drum and which base extends outwardly beyond the top of the font and is seated within the bead 4, when the drum is in operative relation to the burner.

The drum base affords the means by which the drum is hinged to the stove base 1. The portion of the drum base between the drum and the stove base is provided with perforations $15^b$. Two circular rows of perforations are shown, each row extending entirely around the drum base, the lower row being located in proximity to the top of the font, whereby the entering air may pass in close proximity to such top. 17 denotes a false bottom for the drum, said false bottom extending upwardly and outwardly from the inner periphery of the drum bottom 15. The inner edge of the drum bottom 15 and the inner edge of the false bottom 17 may be conveniently clamped by the upper end of the collar 14, such upper end being shown as bent into channel form, as shown at $14^c$, to receive therewithin the horizontal flanges formed at the inner peripheries of the parts 15 and 17. The outer end of the false bottom 17 abuts against the inner surface of the drum 16 and may be provided with an upwardly projecting flange $17^a$, bearing against such drum surface. Between the false bottom the drum bottom and the lower portion of the drum there is formed an annular chamber which is closed at its inner edge and through which the air from beneath may circulate. The outer portion of the false bottom 17, adjacent to the drum 16, is provided with perforations $17^b$. A single row of perforations is shown and these perforations are preferably $\frac{3}{32}$ inch in diameter. It will be observed that the lower part of the drum proper is provided with perforations of an ornamental character, indicated at $16^a$, and these perforations are located between the drum bottom 15 and the false bottom 17.

In Fig. 3 there is shown a modification which differs from the embodiment disclosed in the preceding figures in that the false bottom 18 is imperforate, as is also the portion of the drum base which extends between the bottom of the drum and the stove base 1.

As is the case with the construction shown in Jeavons Patent 1,089,841, the oil font 5 is extremely shallow, as compared with its lateral extent. In this case, as in the case with the patented construction, it is contemplated that the oil shall not be fed by capillary action a distance materially greater than five inches and that the top of the wick tube shall be not materially greater than $1\frac{1}{2}$ inches from the top of the font. This insures the maintenance of the oil below the seepage limit and within the capillary limits of the wick, while the oil travels by capillarity, at all times, in sufficient quantity to keep the exposed surface of the wick well supplied. Furthermore, as is the case with the construction of the Jeavons patent aforesaid, the relation of the parts beneath and heated by the flame to the extended top of the font is such as to warm the oil to a temperature of at least 110°. It has been found that the best results are secured when the temperature of the oil is maintained at substantially 115° and does not materially exceed such temperature, as such temperature reduces the viscosity of the oil to such an extent as to insure an ample capillary feed, while an over supply of vapor from the top of the wick to the flame is prevented. This result is secured in and through the construction and arrangement of parts just described in connection with the false bottom 17 and the arrangement whereby relatively cool air is circulated about the top of the font and beneath the false bottom. As will be seen by reference to the arrows in Fig. 1, air passes upwardly through the slots $3^b$ and through the openings $15^b$ and passes above the top of the font. Some of this air flows through the gallery 12 and supplies the outer portion of the flame burning above the top of the wick tubes. The remainder of the air passes through the perforations in the drum bottom 15, and the greater portion of this air passes out through the openings $16^a$ in the lower end of the drum proper. Some of the air can pass up through the openings $17^b$ and, with perforations of the dimensions set forth and arranged as described, will admit a limited amount of air to the drum which serves to elevate the peripheral portion of the flame and prevent unduly heating the shield therebeneath formed by the false bottom 17, thus assisting to maintain the temperature in the top of the font at about 115°.

In the modification shown in Fig. 3, all of the air for the gallery 12 and for the space beneath the false bottom or shield 18 flows upwardly between the stove base 1 and the vertical wall of the font 5, passes through the segmental slots $3^b$ and into the space beneath the drum base $15^c$, whence it is distributed to the gallery and beneath the shield 18 and through the openings $16^a$. In this case, the false bottom or shield is shown as imperforate, so that there is no circulation of air whatever through the false bottom. This construction, as well as that disclosed in the other views, has proven extremely efficient in operation.

It will be noted that, in maintaining the temperature in the top of the font at about and not materially exceeding 115° F. we secure a circulation of relatively cool air about and above the top of the font and in proximity to the parts adjacent to and beneath the burner, whereby these parts are kept relatively cool—an important consideration in itself and one of the objects attained by our invention; also that we secure these results in and through a construction of heater which will deliver a large amount of heat nearer the floor than in any previous type of heater with which we are familiar; and that, notwithstanding the proximity of the flame to the reservoir and to the lower parts of the heater frame, we preserve these parts at such a temperature that they may be handled without discomfort. For instance, the temperature of the inner portion of the drum base has been reduced by this construction from between 400 to 500° F. to between 200 to 250° F. and the part of the drum base located outside of the drum is sufficiently cool to be handled without discomfort. Although the top of the reservoir is intentionally subject to radiant heat from the drum base, the heating effect is kept within the most efficient limits by the air distributing arrangement provided herein.

In Fig. 3, the chamber provided between the partition 17, the partition formed by the drum bottom, and the lower portion of the drum is out of communication with the combustion space thereabove, although air can circulate therethrough. Furthermore, it will be noted that the openings 16ª are relatively large so that the outer wall of this chamber offers no substantial resistance to the outward radiation of heat from the inclined partition 17. By this arrangement, the top of the font or reservoir is heated only to the temperature desired.

Having thus described our invention, what we claim is:—

1. In an oil stove, the combination of a font, a pair of wick tubes projecting upwardly from said font, a gallery surrounding and spaced from the wick tubes, the top of the font extending outwardly from said gallery, a drum, a base for said drum extending outwardly above the font and extending inwardly substantially as far as the gallery, the base being provided with perforations in the outer and the inner portions thereof, and a shield within the drum and located above the inner portion of the drum base, the portion of the drum between the shield and the base being perforated.

2. In an oil stove, the combination of a font, a pair of wick tubes projecting upwardly from said font, a gallery surrounding and spaced from the wick tubes, the font having a top projecting horizontally outwardly from the gallery, a stove base surrounding and spaced from the font, said base having an annular seat at the upper end thereof and provided with segmental flanges projecting inwardly from said seat, the top of the font being provided with a flange adapted to seat the font upon the segmental flanges, an annular drum base adapted to be supported within said seat and extending above said top and provided with perforations, a drum mounted on said drum base between the inner and outer edges thereof, a collar depending from the inner edge of the drum base and coöperating with the top of the gallery, and a shield projecting downwardly and inwardly from the drum above the inwardly extending part of the drum base, the drum being perforated between said shield and the drum base.

3. In an oil stove, the combination of a font, a pair of wick tubes projecting upwardly from said font, a gallery surrounding and spaced from the wick tubes, the font having a top projecting horizontally outwardly from the gallery, a stove base surrounding and spaced from the font, said base having an annular seat at the upper end thereof and provided with segmental flanges projecting inwardly from said seat, the font being provided with means whereby it may be seated upon the segmental flanges, a perforated annular drum base adapted to be supported within said seat and extending above the top of the font, a drum mounted on said base between the inner and outer edges thereof, and a shield within the drum and above and spaced from the inner portion of the drum base, the drum being perforated between said shield and the drum base therebeneath.

4. In an oil stove, the combination of a font, a pair of wick tubes projecting upwardly from said font, a perforated gallery surrounding the wick tubes, the font having a top extending horizontally outwardly from said gallery, a stove base surrounding the font and having an annular seat with segmental flanges projecting inwardly from said seat with recesses between said flanges, a flange projecting outwardly from the top of the font and adapted to rest on said segmental flanges, an annular drum base adapted to fit within the seat and to extend above the top of the font and above the recesses between the segmental flanges, said drum base being provided with perforations above its outer edge, a drum mounted on said base between the edges thereof, a collar depending from the inner edge of said drum base and adapted to engage the top of the gallery, and a shield having its inner edge in proximity to and in substantial engagement with the inner edge of the drum base and projecting upwardly and outwardly therefrom to the inner wall of the drum, the drum being perforated between said shield and said drum base and the portion of the drum base within the drum being perforated.

5. In an oil stove, the combination of a font, a pair of wick tubes projecting upwardly from said font, the font having a top extending horizontally outwardly from the wick tubes, a stove base surrounding the font and having an annular seat with segmental flanges projecting inwardly from said seat with recesses between said flanges, a flange projecting outwardly from the font and adapted to rest on said segmental flanges, an annular drum base adapted to fit within the seat and to extend above the top of the font and above the recesses between the segmental flanges, a drum mounted on said base between the inner and outer edges thereof, and a shield within the drum above the portion of the drum base therewithin and spaced therefrom and arranged to protect such portion against the radiant heat of the flame above the wick tubes, the arrangement of parts permitting the air flowing through the recesses to circulate between the shield and the drum base.

6. In an oil stove, the combination of a font having an extended top, a burner projecting upwardly therefrom, a drum surrounding said burner, a drum base extending above the top of the font and spaced therefrom and supporting the drum intermediate of the inner and outer edges of said base, the drum base being perforated near its outer periphery and being perforated in the portion which is within the drum, a shield extending outwardly from the inner edge of the drum base as far as the drum and forming a space with the portion of the drum base therebeneath, said drum being perforated between the shield and the drum base.

7. In an oil stove, the combination of a font having a substantially horizontal top, a burner projecting upwardly from said top, a drum surrounding the burner and having a base extending outwardly and inwardly therefrom above the font, and a shield within the drum above the inner portion of said base, the arrangement of parts permitting air to circulate beneath the outer portion of the drum base above the font and through the inner portion of said base and outwardly through the space between the same and the shield.

8. In an oil stove, the combination of a font, a burner projecting upwardly from said font, the top of the font extending outwardly from said burner, a stove base surrounding the font and having an annular seat with segmental flanges projecting inwardly from said seat, each of said flanges being provided with one or more upwardly projecting bosses, there being recesses between said flanges, a flange projecting outwardly from the font and adapted to rest upon said bosses, an anular drum base adapted to fit within the seat and to extend inwardly above the top of the font and above the recesses between the segmental flanges, said drum base being provided with perforations above its outer edge, a drum mounted on said base between the edges thereof, a shield within the drum and above the drum base and spaced therefrom, the portion of the drum base below the shield being perforated and the portion of the drum between the shield and the drum base being perforated.

9. In an oil stove, the combination of a font, a burner projecting upwardly from said font, the top of the font extending outwardly from said burner, a stove base surrounding the font and having an annular seat with segmental flanges projecting inwardly from said seat, each of said flanges being provided with one or more upwardly projecting bosses, a flange projecting outwardly from the font and adapted to rest upon said bosses, an annular drum base adapted to fit within the seat and to extend inwardly above the top of the font and above the recesses between the segmental flanges, a drum mounted on said base between the edges thereof, an annular shield within the drum and above the drum base and spaced therefrom and forming an annular chamber therewith which is closed at its inner end, the portion of the drum base below the shield being perforated and the portion of the drum between the shield and the drum base being perforated.

10. In an oil stove, the combination of a font having a top, a burner projecting upwardly from said top, a drum surrounding the burner and having an annular bottom extending inwardly above the font, and an annular shield within the drum and above such bottom and forming therewith an annular chamber which is closed at the inner edge, the arrangement of parts permitting air to circulate above the font and outwardly through said chamber.

11. In an oil stove, the combination of a font, a burner projecting upwardly from said font, a drum surrounding the burner, an annular bottom for said drum and extending outwardly above the top of the font from the burner to the drum, said bottom being perforated, an annular shield within the drum and located above such drum bottom and forming therewith a chamber which is closed at the inner edge, the portion of the shield which is adjacent to the drum being provided with perforations arranged to admit a limited supply of air therethrough and the wall of the drum between the shield and the drum bottom being perforated.

12. In an oil stove, the combination of a font, a burner projecting upwardly from said font, a drum surrounding the burner, an annular bottom for said drum extending outwardly above the top of the font from the burner to the drum, and an annular shield within the drum and located above such drum bottom and forming therewith a chamber which is closed at the inner edge, the portion of the shield which is adjacent to the drum being provided with perforations arranged to admit a limited supply of air therethrough and the portion of the drum between said annular bottom and said annular shield being perforated for the circulation of air therethrough.

13. The combination of a combustion chamber, means for producing a flame therein, a device for causing the flame to spread outwardly as it rises, a diaphragm constructed and arranged adjacent to the flame and extending substantially parallel therewith from a point near its base to a point near its upper extremity, and a casing surrounding the said flame and extending above and below the same and provided with openings below the upper extremity of said diaphragm, said diaphragm secured to said casing above the openings, and a partition below the said diaphragm provided with openings through which air passes to the said diaphragm and to the said openings in the casing.

14. The combination, with a font, of a burner projecting thereabove, a drum surrounding and extending above said burner and providing a combustion space thereabove, and a pair of partitions extending inwardly from the lower portion of the drum toward the burner and forming with such portion of the drum a chamber interposed between the combustion space and the font, the upper of said partitions being inclined downwardly from said drum and the portion of the drum between said partitions offering no material resistance to the outward radiation of heat from the upper partition.

In testimony whereof, we hereunto affix our signatures in the presence of two witnesses.

WILLIAM R. JEAVONS.
ARNOLD R. WHITTAKER.

Witnesses:
J. B. HULL,
BRENNAN B. WEST.